United States Patent Office 3,761,442
Patented Sept. 25, 1973

3,761,442
METHOD OF PIGMENTING VINYL TILE
Lindo Paul Nangeroni, Bound Brook, N.J., assignor to American Cyanamid Company, Stamford, Conn.
No Drawing. Continuation of abandoned application Ser. No. 762,373, Sept. 16, 1968. This application May 27, 1971, Ser. No. 147,699
Int. Cl. C08f 45/04, 45/10
U.S. Cl. 260—41 B                    3 Claims

ABSTRACT OF THE DISCLOSURE

A process for making moldable compositions which comprises mixing titanium dioxide pigment with a polymer composition in the presence of water to obtain a homogeneous blend and heating the blend to remove the water therefrom. The vinyl composition is comprised of a vinyl polymer and asbestos.

---

This application is a continuation of Ser. No. 762,373 filed Sept. 16, 1968, now abandoned.

This invention relates to a method for producing vinyl polymer compositions containing titanium dioxide and asbestos. More particularly, this invention relates to the preparation of vinyl polymer compositions containing asbestos and titanium dioxide by a method which includes a step of mixing titanium dioxide with a vinyl polymer composition in the presence of water.

Vinyl polymer compositions containing asbestos and titanium dioxide can be made into strong molded products, particularly tiles and sheeting materials, useful for covering floors, walls and ceilings. Titanium dioxide is employed as a white pigment because of its excellent properties with regard to opacification, whiteness, brightness, stability and inertness to other materials which are normally incorporated into polymeric compositions. At the present time, titanium dioxide is blended as a dry pigment into a vinyl polymer composition containing asbestos until a homogeneous blend is obtained. The blend is then processed and formed to obtain the desired final product.

It is desirable that the materials employed in forming the blend and the method of processing be such as to obtain a final product having excellent whiteness characteristics. Furthermore, when a colored final product is produced by incorporating colorants such as colored pigment or a dye therein, it is still highly desirable to have a base composition comprising a vinyl polymer, pigmentary $TiO_2$ and asbestos which has the highest degree of white color obtainable in order to obtain true colors from the colored pigments or dyes used. To this end, the highest quality pigments are employed and the processing steps employed are such as to minimize or prevent polymer degradation caused by moderately elevated temperatures normally encountered during processing. Thus, it is present practice to employ in addition to the base composition, extenders, plastizers and stabilizers to minimize yellowing the polymer in the mixing and forming steps. It is preferred that the final product reflect the maximum amount of incident white light and that the reflected white light have a blue shade. These products have a greatly improved white appearance and pigmented products obtained therefrom are of excellent quality due to the absence of undesirable shades or tints.

It is an object of the present invention to provide a process for preparing vinyl polymer compositions containing titanium dioxide and asbestos having improved brightness and blueness characteristics. A further object of the present invention is to provide a vinyl polymer composition containing titanium dioxide pigment and asbestos which can be easily colored to obtain high quality products. Further objects of the present invention will become evident in view of the following detailed description.

The present invention provides a process for making vinyl polymer compositions containing titanium dioxide and asbestos whereby the vinyl polymer is mixed with asbestos and titanium dioxide in the presence of water. The water is removed from the resultant mixture prior to and/ or during the forming of the mixture into a final product. It has been found that by operating in this manner rather than by using titanium dioxide in the absence of water, products having greatly improved brightness and blueness are obtained.

Surprisingly, it has been found that the present invention is limited to vinyl polymer compositions containing asbestos and small amounts of a plasticizer to improve working properties. Significant improvements are not obtained when employing compositions conventionally known in the art as "plasticized" vinyl polymer, i.e., those compositions having sufficient amounts of plasticizer to achieve flexible properties, or with other compositions such as polyethylene and polystyrene.

In carrying out the process of the present invention, the mixing or blending of the dry vinyl polymer composition with the asbestos and titanium dioxide is carried out in the presence of water. The point of addition of the water to the composition is not critical. Thus, the water may be added to any of the components separately or to any blend of the components at any step of the blending operation prior to fusing the composition. Thus, it is often convenient to form an aqueous paste or slurry of the titanium dioxide which is then blended with the other ingredients. The blending can be carried out by a mixing or agitating operation in any manner known in the art such as by the use of high intensity mixers, ribbon blenders, tumblers and the like. Usually, the process is carried out in two steps, the first step being a mixing step to achieve preliminary mixing of the ingredients and the second step being the final fusion wherein a homogeneous dispersion is obtained.

Although it is not necessary to remove all the water prior to the final step of fabrication of the composition into molded products, it is convenient to remove all or part of the water during the mixing step or during the final blending step in suitable equipment such as a two-roll mill or Banbury mill. During the mixing step, it is sometimes desirable to employ elevated temperatures in the range of about 180° F., and about 200° F., to remove all or a substantial portion of the water from the final polymer blend. However, the mixing step may also be carried out at ambient temperatures and the mix, still containing the water, may then be subjected to the next operation of homogeneous dispersion of the ingredients in an equipment such as mentioned above.

Since the final dispersion operation is carried out at an elevated temperature, it is preferred to remove substantially all of the water during the operation prior to forming the composition into a shaped product. This is desirable to prevent cracks and imperfections from forming in the product in the final shaping step since the presence of water may result in cracks and imperfections caused, for example, by steam fissures. The blend, after the final fusion step, is then formed into the final product preferably by a calendering operation. Compression molding or extrusion processes may also be employed if desirable.

Any form of titanium dioxide pigment normally employed in this art can be employed in the process of the present invention including anatase type and the rutile type. The amount of titanium dioxide employed is well known in the art and is dependent upon the degree of opacity and whiteness that is desired in the final product but less than that which will cause chalking or serious weakening of the final product. The amount of titanium dioxide employed is in the range of between about 1 and about 20 weight percent of the final product.

The amount of water employed in the process of this invention is at least about 5% based on the weight of the titanium dioxide. There is no critical upper limit to the amount of water which may be used. However, more than about 400% based upon the weight of titanium dioxide is not desirable due to the heat requirements, time and manipulation necessary to remove excessive amounts of water. As stated above, the water may be added at various stages of the mixing process or in conjunction with the titanium dioxide as a paste or slurry.

When it is desired to form an aqueous slurry of titanium dioxide, the amount of water employed is that which will permit effective homogeneous dispersion of the titanium dioxide pigment therein and is between about 20 and 80 weight percent of the titanium dioxide slurry. In preparing the slurry, there is no critical upper limit on the amount of water employed except that more than about 80% is not desirable since it is desirable to minimize the heating requirements needed for the process.

A surfactant or dispersing agent can be employed in addition in the composition and can be added to the water-titanium dioxide slurry when a preformed slurry is used. Various types, both organic and inorganic, are suitable such as sodium salts of aryl sulfonic acids, sodium hexametaphosphate or potassium tripolyphosphate. The surfactant is not necessary in the process of the present invention. However, the surfactant or dispersing agent reduces the time needed to obtain a homogeneous slurry.

Suitable surfactants which can be employed include also other inorganic surfactants such as tetrapotassium pyrophosphate and tetrasodium pyrophosphate; and organic surfactants such as the sodium salt of polymerized carboxylic acids (sold under the tradenames of Daxad 30 and Tamol 731 Surfactants); sodium salts of dialkyl sulfosuccinates (as disclosed, for example, in U.S. 2,441,-341); N-alkyl substituted alkali metal sulfosuccinates (as disclosed in U.S. 2,252,401); ethylene oxide nonyl phenol condensates; polyethylene glycol alkylphenyl ethers; sodium salts of complex organic phosphate esters and the like.

The asbestos is in the form of elongated fibers. Typical fibers which can be employed include asbestos fibers having a surface area in the range of 18,000 to 25,000 cm./gram. The amount of asbestos in the final composition is that which is normally employed to promote increased hardness in the final product without decreasing the strength thereof and is employed in amounts of between about 15 and 30 weight percent of the final product.

Suitable vinyl polymers which can be employed in the process include homopolymers and copolymers of vinyl chloride which may have a major proportion of vinyl chloride, for example from about 75 to 100%; or may be copolymerized with up to about 25% of comonomer such as vinyl acetate or vinylidene chloride.

Since vinyl polymers, especially poly(vinyl chloride), are generally degraded by temperatures normally encountered in presently employed polymer processing techniques, it is preferred to employ extenders, stabilizers and/or plasticizers in the compositions of the present invention. Suitable extenders include calcium carbonate and clay. It is preferred to employ an alkali type of extender when processing polymers derived from vinyl halides in order to combine with free halide produced during processing and thus decrease the tendency of the resultant composition to degrade. Plasticizers promote ease of mixing of the vinyl polymer compositions and thus reduce the heat of friction during processing. Suitable plasticizers include any of those normally employed in vinyl compositions but not in amounts to achieve flexible properties for the final composition. The amount of plasticizer employed is less than 10 weight percent and generally between 2 and 10 weight percent based on the weight of the final composition. Exemplary plasticizers which can be employed are dioctyl phthalate, diisooctyl phthalate or ditridecyl phthalate. Furthermore, when it it desired to produce a colored final product, a colorant such as a dye or a colored pigment can be incorporated into the vinyl polymer composition.

The following examples illustrate the process of the present invention and are not intended to limit the same.

EXAMPLE 1

For the preparation of vinyl asbestos tiles, the following formulation was prepared:

|  | Parts per 100 parts resin |
|---|---|
| Vinyl chloride-vinyl acetate copolymer (Union Carbide's VYFS) | 100.00 |
| Asbestos fibers | 100.00 |
| Limestone powder | 160.00 |
| Dioctyl phthalate | 18.00 |
| Epoxidized tall oil | 2.00 |
| Titanium dioxide (anatase, 0-110, 16 parts and 16 parts water) | 16.00 |
| Barium-cadmium soap | 4.00 |

The vinyl resin, asbestos, limestone, $TiO_2$ and the barium cadmium soap stabilizer were placed in a tumbler and rolled 45 minutes at room temperature. The dioctyl phthalate and tall oil stabilizer were added to the center of the premix before any blending.

The premix, after blending, was then masticated through a 2-roll mill with front roll at 305–310° F., back roll cool. During this step, all the water was evaporated from the composition. After complete mastication, the mix was compression molded into a floor tile using a Farrell 50 ton hydraulic press wherein the samples are placed in juxtaposition using a 2 minute preheat full steam at 110–120 p.s.i. The pressure was increased slowly to 11 tons/p.s.i. and held for one minute. The product was cooled for 7½ minutes and recovered.

Additional batches were prepared and compression molded in the manner set forth above except that dry $TiO_2$ or $TiO_2$ slurries containing different amounts of water were added to the blend mixture and blended.

The tiles obtained from each composition were evaluated for brightness and blue cast using a Hunter Lab Model D-25 color difference meter. Table I shows the $TiO_2$ compositions employed to prepare the blends and the brightness and blueness qualities of the tiles produced therefrom.

TABLE I

| $TiO_2$ composition | Diffuse reflectance [1] | Blueness measure [2] |
|---|---|---|
| Anatase, dry | 49.3 | 1.0 |
| Anatase, 50% aqueous slurry | 51.4 | 0.4 |
| Anatase, 33% aqueous slurry | 51.0 | 0.4 |
| Rutile, dry | 53.3 | 1.4 |
| Rutile, 50% aqueous slurry | 54.9 | 0.5 |
| Rutile, 50% aqueous slurry plus 0.2% surfactant | 55.2 | 0.4 |
| Anatase, dry formulation, tinted with phthalocyanine blue (1:99) | 33.4 | |
| Anatase, 50% aqueous slurry tinted with phthalocyanine blue (1:99) | 34.5 | |

[1] Diffuse reflectance figure is a measure of brightness; the higher the number, the greater the brightness; a difference of 0.2 is significant and observable.

[2] Blueness measure figure shows degree of bluish cast; the lower the number, the more bluish.

As shown in Table I, the compositions obtained by the process of this invention are characterized by improved brightness and significantly increased blueness.

EXAMPLE 2

Using procedures as described in Example 1, additional experiments were performed with aqueous dispersions of anatase titanium dioxide and water at various concentration ranges. The formulation tested was that shown in Example 1 with 16.00 parts of the titanium dioxide added as a dispersion as shown in Table II per 100 part resin. In addition to the use of preformed aqueous titanium dioxide compositions, a variation of the process was also used in which the dry titanium dioxide was used and the water was added during the mixing stage. The mixed compositions were fused on a heated 2-roll mill. Each fused composition was then formed into tiles in a heated chrome-plated press. The tiles were tested for diffuse reflectance and blueness in the manner described in Example 1. The results were as follows:

TABLE II

| $TiO_2$ composition or mode of addition | Diffuse reflectance | Blueness measure |
|---|---|---|
| Dry (control) | 53.6 | 1.6 |
| Preformed paste, 10% water | 54.9 | 1.1 |
| Preformed paste, 20% water | 54.7 | 1.0 |
| Preformed slurry, 30% water | 54.9 | 0.8 |
| Preformed slurry, 68% water | 55.9 | 0.3 |
| 30% water added to blend during mixing stage | 54.7 | 1.0 |
| 68% water added to blend during mixing stage | 55.9 | 0.3 |

EXAMPLE 3

The following polymer formulations were prepared and the compositions processed into a tile form. Formulations were made of each polymer using dry $TiO_2$ and an aqueous slurry of $TiO_2$. The appearance of each formulation made with the aqueous slurry was compared with that of the formulation made with the dry $TiO_2$. In each instance, the appearance was the same, there being no difference in brightness or the diffuse reflectance characteristics. In the formulations, carbon black is present as a colorant to show opacity of the $TiO_2$. All figures in Table III are parts by weight.

TABLE III.—FLEXIBLE PLASTICIZED VINYL—BLEND A

[Poly(vinyl chloride) (Union Carbide, QYSJ), 100; Dioctyl phthalate, 34; Barium Cadmium soap, heat stabilizer, 2.5; Stearic acid, 5]

| | Control | Aqueous slurry |
|---|---|---|
| Blend A | 100 | 100 |
| Asbestos fibers | 5 | 5 |
| Anatase $TiO_2$ | 5.0 | 5.0 |
| Water for slurry | | 2.5 |
| Carbon black master batch (5% pigment in resin) | 1.65 | 1.65 |
| Polystyrene: | | |
| Polystyrene resin (Styron 66) | 100 | 100 |
| Anatase $TiO_2$ | 5 | 5 |
| Water for slurry | | 4 |
| Carbon black master batch (1% pigment in resin) | 6 | 6 |
| Polyethylene: | | |
| Polyethylene (low density) | 100 | 100 |
| $TiO_2$ | | |
| Water for slurry | | .43 |
| Carbon black master batch (2% pigment in resin) | | |

This example shows that there is no improvement in either brightness or diffuse reflectance when employing aqueous slurries of $TiO_2$ with polymers other than those employed in the present invention.

The water may be provided in the compositions of the invention in macroencapsulated or microencapsulated form with or without the other ingredients such as asbestos or the titanium dioxide. Suitable encapsulation techniques including the material of the capsule itself are well known as illustrated by U.S. Pats. 3,160,686 and 3,161,602. Suitable microcapsules may range in size from about 500 to about 5,000 microns, although smaller or larger capsules may be employed. Encapsulation of the water, alone or in admixture with one or more of the other ingredients, has the advantage of preventing loss of water or the other components in the period prior to final blending. Such periods, for example, may be the extended storage times sometimes encountered in maintaining inventories of the composition of the invention. A further advantage, of course, is maintenance of quality of the composition during periods of storage or transit. To blend the components of the composition containing the encapsulated ingredients, it is simply necessary to rupture the capsules, usually by the forces normally encountered in a blending or mixing process, and if desired, in combination with heating.

I claim:

1. In a process of making moldable compositions particularly useful for floor tiles which comprises mixing vinyl chloride polymers which comprise from about 75 percent to about 100 percent of polyvinyl chloride, up to 25 percent vinyl acetate and up to 25 percent vinylidene chloride, asbestos fibers, titanium dioxide pigment and water and heating the mixture to remove the water therefrom, the improvement of restricting said pigment to between about one percent to about twenty percent by weight based on the final moldable composition and mixing in the presence of about twenty percent to about eighty percent water based upon the weight of said pigment whereby a homogeneous blending of said mixture is achieved which blending provides a molded composition of enhanced brightness.

2. The process of claim 1 wherein the water is added to the polymer composition and titanium dioxide while mixing the moldable composition.

3. The process of claim 1 wherein the polymer composition contains a colorant in addition to the titanium dioxide pigment.

References Cited

UNITED STATES PATENTS

| 3,202,622 | 8/1965 | Scullin | 260—41 R |
| 3,440,208 | 4/1969 | Foglia et al. | 260—41 R |
| 3,102,063 | 8/1963 | Ray | 162—155 |
| 3,356,564 | 12/1967 | Briener | 162—155 |
| 2,835,620 | 5/1958 | Bartlett | 260—34.2 |
| 3,257,267 | 6/1966 | Hay | 252—316 |
| 3,486,946 | 12/1969 | Duddy | 260—2.5 M |

THEODORE MORRIS, Primary Examiner

U.S. Cl. X.R.

260—34.2

UNITED STATES PATENT OFFICE
CERTIFICATE OF CORRECTION

Patent No. 3,761,442     Dated September 25, 1973

Inventor(s) NANGERONI, LINDO PAUL

It is certified that error appears in the above-identified patent and that said Letters Patent are hereby corrected as shown below:

TABLE III

Column 5, line 49 - In the line $TiO_2$ under the headings "Control and "Aqueous Slurry" should be entered --1.0-- in each instance.

In the line Carbon black master batch (20% pigment in resin) should be entered under the headings referred to above -- .6 -- in each instance.

Signed and sealed this 23rd day of July 1974.

(SEAL)
Attest:

McCOY M. GIBSON, JR.
Attesting Officer

C. MARSHALL DANN
Commissioner of Patents